United States Patent [19]

Van Broekhoven

[11] Patent Number: 5,001,221

[45] Date of Patent: Mar. 19, 1991

[54] POLYMERIZATION OF CARBON MONOXIDE/OLEFIN WITH CATALYST/DILUENT RECYCLE

[75] Inventor: Johannes A. M. Van Broekhoven, Amsterdam, Netherlands

[73] Assignee: Shell Oil Company, Houston, Tex.

[21] Appl. No.: 390,145

[22] Filed: Jul. 28, 1989

[30] Foreign Application Priority Data

Sep. 19, 1988 [NL] Netherlands .................. 8802312

[51] Int. Cl.$^5$ .............................................. C08G 67/02
[52] U.S. Cl. ...................... 528/392; 526/69; 526/70
[58] Field of Search ................ 528/392; 526/69, 70

[56] References Cited

U.S. PATENT DOCUMENTS 3,694,412 9/1972 Nozaki .......................... 260/63 CQ
4,880,909 11/1989 Van Broekhoven et al. ........ 526/69

FOREIGN PATENT DOCUMENTS 121965 10/1984 European Pat. Off. .
181014 5/1986 European Pat. Off. .
213671 3/1987 European Pat. Off. .
257663 3/1988 European Pat. Off. .

*Primary Examiner*—Harold D. Anderson
*Attorney, Agent, or Firm*—Dean F. Vance

[57] ABSTRACT

In the process for the production of a linear alternating polymer of carbon monoxide and at least one ethylenically unsaturated hydrocarbon, the liquid portion of the product mixture is suitable for recycle as the catalyst composition mixture in subsequent polymerizations when the linear alternating polymer produced has a limiting viscosity number, measured in m-cresol at 60° C., of from about 0.5 dl/g to about 2.5 dl/g and a melting point of at least 225° C.

8 Claims, No Drawings

POLYMERIZATION OF CARBON MONOXIDE/OLEFIN WITH CATALYST/DILUENT RECYCLE

FIELD OF THE INVENTION

This invention relates to a improved process for the production of linear alternating polymers of carbon monoxide and at least one ethylenically unsaturated hydrocarbon. More particularly, the invention relates to a consecutive process for the production of such polymers wherein the liquid portion of the product mixture of a preceding polymerization is recycled as the catalyst composition solution for a subsequent polymerization.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of these polymers, now becoming known as polyketones or polyketone polymers, are illustrated by a number of published European Patent Applications including 121,965, 181,014, 213,671 and 257,663. The process, now considered to be broadly conventional, generally involves the use of a catalyst composition formed from a compound of a Group VIII metal selected from palladium, cobalt or nickel, the anion of a non-hydrohalogenic acid having a pKa below about 6 and preferably below 2, and a bidentate ligand of phosphorus, arsenic or antimony. The resulting polyketone polymers are relatively high molecular weight thermoplastics having established utility in the production of shaped articles by the methods which are conventional for thermoplastic polymers.

The process of producing the polyketone polymers typically involves contacting the carbon monoxide and ethylene hydrocarbon(s) under polymerization conditions in the presence of the catalyst composition and a reaction diluent in which the catalyst composition is soluble but in which the polyketone polymer product is relatively insoluble. In theory, this procedure should allow recycle of the liquid portion of the polyketone polymer product mixture containing the catalyst composition subsequent to removal of the insoluble polyketone polymer by filtration, decantation or other conventional procedures. However, in practice the situation regarding recycle is more complex. A portion of the catalyst composition, and in some instances a substantial portion, is occluded within the polymeric product and the resulting liquid portion of the product mixture is accordingly at least somewhat depleted in catalyst composition, particularly the palladium component. In such instances, the liquid portion, if recycled, would not efficiently function as a polymerization medium without the provision of additional catalyst composition. In addition, in all instances, the polymerization produces a certain amount of low molecular weight oligomer but in some instances the oligomer production is substantial. These oligomers are often soluble in the reaction diluent and recycle of the liquid portion of such a product mixture would lead to the undesirable build-up of oligomer. As a result of these difficulties, the liquid product of the production of the polyketone polymers is typically recovered and separated by distillation into a distillate comprising reaction diluent and a residue comprising the catalyst components and the oligomers. This catalyst-containing residue is decomposed if desired to obtain palladium useful in the production of new catalyst composition components. It would be of advantage to provide an improved process for the production of the polyketone polymers in which the liquid portion of a product mixture could be directly recycled for use in the subsequent polymerization.

SUMMARY OF THE INVENTION

The present invention provides an improved process for the production of linear alternating polymer of carbon monoxide and at least one ethylenically unsaturated hydrocarbon. More particularly, the invention provides an improved process wherein the liquid portion of the product mixture of such a polymerization process is suitably recycled for use as the catalyst composition mixture in a subsequent polymerization.

DESCRIPTION OF THE INVENTION

The invention is based on the finding that during the production of certain polyketone polymers having physical porperties within certain limits, the proportion of the palladium remaining in the liquid phase of the polymerization product mixture is sufficiently high, and the production of soluble oligomer is sufficiently low, that the liquid portion is suitably recycled for use as catalyst composition mixture in a subsequent polymerization without the addition of additional catalyst composition components.

The polyketone polymers produced by the improved process of the invention are linear alternating polymers of carbon monoxide and at least one ethylenically unsaturated hydrocarbon. The ethylenically unsaturated hydrocarbons useful as precursors of the polyketone polymers have up to 10 carbons inclusive and are aliphatic including ethylene and other $\alpha$-olefins including propylene, 1-butene, isobutylene, 1-hexene and 1-decene, or are arylaliphatic containing an aryl substituent on an otherwise aliphatic molecule, particularly an aryl substituent on a carbon atom of the ethylene unsaturation. Illustrative of this latter class of ethylenically unsaturated hydrocarbons are styrene, p-methylstyrene, p-ethylstyrene and m-methylstyrene. The preferred polyketone polymers are copolymers of carbon monoxide and ethylene or terpolymers of carbon monoxide, ethylene and a second hydrocarbon of at least 3 carbon atoms, particularly an $\alpha$-olefin such as propylene.

When the preferred terpolymers are produced there will be at least about 2 units incorporating a moiety of ethylene for each unit incorporating a moiety of the second hydrocarhon. Preferably, there will be from about 10 to about 100 units incorporating a moiety of ethylene per unit incorporating a moiety of the second hydrocarbon. The polymer chain of the preferred polymers is therefore represented by the formula

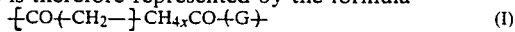  (I)

wherein G is the moiety of a second hydrocarbon polymerized through the ethylenic unsaturation. The $-CO-(CH_2-CH_4)-$ units and the $-CO-(G)-$ units are found randomly throughout the polymer chain and the ratio of y:x is no more than about 0.5. In the modification of the improved process of the invention which produces copolymers without the presence of a second hydrocarbon, the polymers are represented by the above formula (1) wherein y is 0. When y is other than 0, i.e., terpolymers are produced, the preferred ratio of y:x is from about 0.01 to about 0.1. The end groups or "caps" of the polymer chain will depend upon what materials are present during the polymerization and whether and how the polymers are purified. The precise nature of the end groups is of little significance so far as the overall properties of the polymer are concerned so that the polymer is fairly represented by the above formula for the polymer chain.

The process of the invention is applied to the production of linear alternating polymers having a limiting viscosity number (LVN), when measured in m-cresol at 60° C., of from 0.5 dl/g to 2.5 dl/g and which have a melting point of 225° C. or higher. When polyketone polymers of these physical properties are produced, the liquid portion of the polyketone product mixture is sufficiently high in palladium content and sufficiently low in oligomer content to permit recycle of the liquid to serve as the catalyst composition solution of a subsequent polymerization. Although a number of polyketone polymers of the above formula (I) will meet the above criteria for LVN and melting point, the preferred polyketone polymers for purposes of the present invention are copolymers of carbon monoxide and ethylene or terpolymers of carbon monoxide, ethylene and propylene.

Although the scope of the process for polyketone production is extensive as illustrated by the above published European Patent Applications, in order to obtain polyketones having the above physical properties a catalyst should be used which comprises a palladium salt, an anion of certain strong non-hydrohalogenic acids and a bidentate phosphorus ligand of somewhat specific structure. Suitable palladium salts include palladium alkanoates, and alkanoates such as palladium acetate, palladium propionate, palladium hexanoate and palladium actanoate are satisfactory. Palladium acetate is preferred. The anion is the anion of a nonhydrohalogenic acid having a pKa below 2 which is an inorganic acid such as sulfuric acid or perchloric acid or an organic acid including carboxylic acids such as trichloroacetic acid, difluoroacetic acid and trifluoroacetic acid, and sulfonic acids such as methanesulfonic acid and p-toluenesulfonic acid. The anion of trifluoroacetic acid is particularly preferred. The anion is customarily and preferably provided in the form of the free acid although in another modification of the process the anion is provided as a non-noble transition metal salt, particularly as a copper salt. The bidentate phosphorus ligand is a ligand of the formula

  (II)

wherein R independently is aromatic group substituted on at least one ring carbon ortho to the ring carbon through which the group is bound to the phosphorus with a lower alkoxy substituent. Preferred R groups are alkoxyphenyl groups such as 2-methoxyphenyl, 2,4-diethoxyphenyl and 2,4,6-trimethoxyphenyl. The R' group is a divalent bridging group having from 2 to 4 carbon atoms in the bridge. Preferred R groups are polymethylene groups, i.e., groups of the formula $-CH_2-_n$ wherein n is an integer from 2 to 4 inclusive. Particularly preferred is the trimethylene or 1,3-propylene group. Best results are obtained in the process of the invention when the bidentate phosphorus ligand is 1,3-bis[di(2-methoxyphenyl)phosphino]propane.

Sufficient catalyst composition is employed to provide from about $1 \times 10^7$ mol to about $1 \times 10^{-3}$ mol of palladium per mol of olefin to be polymerized. Amounts of catalyst sufficient to provide from about $1 \times 10^{-6}$ mol to about $1 \times 10^{-4}$ mol of palladium per mol of olefin to be polymerized are preferred. The anion is provided in a quantity of from about 0.5 mol to about 50 mols per mol of palladium with anion quantities of from about 1 mol to about 25 mols per mol of palladium being preferred. The bidentate phosphorus ligand is typically provided in a quantity of from about 0.5 mol to about 2 mols per mol of palladium but more often is provided in a quantity of from about 0.75 mol to about 1.5 mol per mol of palladium.

It is useful on occasion to provide to the catalyst composition mixture an organic oxidizing agent as a fourth component in order to enhance the activity of the catalyst. Organic oxidants useful for this purpose include aliphatic nitrite compounds such as butyl nitrite and hexyl nitrite, aromatic nitro compounds such as nitrobenzene and 2,4-dinitrotoluene, and both 1,2- and 1,4-quinones. The quinones constitute a preferred class of organic oxidizing agents and benzoquinones, naphthoquinones and anthraquinones are satisfactory. The 1,4-quinones are particularly preferred, especially 1,4-benzoquinone. No oxidizing agent is required in the catalyst composition mixtures but if employed the oxidizing agent is present in a quantity of up to 5000 mol per mol of palladium. When present the organic oxidant is preferably present in a quantity from about 10 mols to about 1000 mols per mol of palladium.

The polymerization according to the invention is conducted by contacting the carbon monoxide, ethylene and optionally propylene in the case wherein terpolymers are desired, under polymerization conditions, in the presence of the catalyst composition and the reaction diluent. The relative amounts of carbon monoxide and olefin to be polymerized should be such to provide an olefin/carbon monoxide partial pressure ratio from about 0.5 to about 5. Preferably, the olefin/carbon monoxide partial pressure ratio will be from about 0.6 to about 3.5. Typical polymerization conditions include a polymerization temperature of from about 40° C. to about 120° C. with polymerization temperatures from about 50° C. to about 100° C. being preferred. The overall reaction pressure is suitably from about 20 bar to about 150 bar but reaction pressures from about 30 bar to about 100 bar are preferred. Suitable reaction diluents include the lower alkanols such as methanol and ethanol Methanol is particularly preferred as the reaction diluent.

The contacting of the reactants, catalyst composition and reaction diluent takes place in a suitable reactor wherein reactant/ catalyst contact is maintained by conventional methods such as shaking or stirring. The polymer product is obtained as a substantially insoluble material in thereaction diluent and is recovered by well known procedures such as filtration or decantation. When the polymerization is conducted according to the invention, the liquid portion of the product mixture is suitably recycled to serve as the catalyst composition mixture in subsequent polymerization.

The particular relationship of the composition of the liquid portion of the product mixture to the catalyst composition components, the relative proportion of such components, the nature and proportions of the monomeric reactants and the polymerization conditions is not understood with certainty. It is considered likely, however, that these factors influence the reaction rate to an extent such that whenever these factors are employed as described above a polymer with an LVN of from about 0.5 dl/g to about 2.5 dl/g and a melting point above 225° C. is obtained as insoluble product and the liquid portion of the product mixture will be relatively high in palladium content and relatively low in oligomer content. This permits the use of the liquid portion as catalyst composition mixture in subsequent polymerization.

Even in the improved process of the invention there will be a need from time to time to adjust the composition and volume of the recycle catalyst composition mixture. Since some palladium is lost to the polymer product there will be make-up palladium and other catalyst composition components added to the catalyst recycle on occasion. However, because of the nature of the improved process of the invention there will be a considerably lessened need for such make-up catalyst composition components. It is also useful to wash the polymer product subsequent to its isolation to remove catalyst composition components adsorbed on the surface of the polymer. This wash liquid is often combined with the liquid portion of the product mixture and this practice leads to ever increasing volumes of recycle stream. The excess recycle liquid is removed when necessary as by distillation and may be used, for example, as wash liquid. The amount of oligomer, although low in any one polymerization will also build up over time. The amount of oligomer is generally controlled by a small bleed from the recycle stream.

The polyketone polymer product of the process of the invention is a thermoplastic material of established utility and is processed by procedures which are conventional for thermoplastics such as injection molding, extrusion and thermoforming. The polymer is processed into sheets, films, wire and cable, fibers and shaped articles. Illustrative of specific application is the processing of the polymer into shaped articles useful as containers for food and drink.

The invention is further illustrated by the following Comparative Examples (not of the invention) and the Illustrative Embodiments which should not be construed as limiting the invention. The polymer products which were copolymers were determined by —sC-NMR analysis to be of the repeating formula —CO+C$_2$H$_4$+ and the terpolymer products were determined by 13 C-NMR to be made up —CO+C$_2$H$_4$+ units and —CO+C$_3$H$_6$+ units randomly distributed within the polymer.

COMPARATIVE EXAMPLE I

A copolymer of carbon monoxide and ethylene was produced by charging to a mechanically stirred autoclave of 3.8 liter capacity a 2 liter quantity of methanol. The contents of the autoclave were warmed to 50° C. and sufficient carbon monoxide and ethylene were added to the autoclave to give partial pressures of 27 bar and 13 bar respectively. A catalyst composition solution was then added which comprised 45 ml of methanol, 15 ml of toluene, 0.1 mmol palladium acetate, 2 mmol trifluoroacetic acid and 0.12 mmol 1,3-bis(diphenylphosphino)propane. The pressure within the autoclave was maintained by the addition of an equimolar mixture of carbon monoxide and ethylene. After 5.2 hours the polymorization was terminated by cooling the autoclave and contents to room temperature and releasing the pressure. The copolymer product was removed by filtration to obtain 1.1 liter of filtrate. The copolymer was washed with 1.3 liter of fresh methanol and dried to give 72 g of copolymer having an LVN, measured in m-cresol at 60° C., of 1.8 dl/g and a melting point of 257° C.

The filtrate and the wash liquid were combined to give 2.4 liters of methanolic solution which, by analysis, was found to contain 1.4 mg of palladium and 0.94 g of oligomers. Thus, 13% wt of the palladium was found in the liquid phases and the oligomer production, based on copolymer formed, was 1.3% wt.

COMPARATIVE EXAMPLE II

A terpolymer of carbon monoxide, ethylene and propylene was produced by a procedure substantially like that of Comparative Example I except that quantities of carbon monoxide, ethylene and propylene were employed to give partial pressures of 32 bar, 15 bar and 7 bar respectively, and the reaction time was 6 hours. A quantity of 108 g of terpolymer was obtained having an LVN, measured in m-cresol at 60° C., of 0.8 dl/g and a melting point of 238° C. When the filtrate and wash liquid were combined, 2.3 liters of methanolic solution which contained 1.6 mg of palladium and 1.2 g oligomers. Therefore, 15% wt of the palladium was found in the liquid phases and the oligomer production was 1.1% wt., based on polymer produced.

COMPARATIVE EXAMPLE III

A carbon monoxide/ethylene copolymer was produced by a procedure substantially like that of Comparative Example I except that the reaction temperature was 80° C., quantities of carbon monoxide and ethylene were provided to give partial pressures of 28 bar and 32 bar, respectively, the reaction time was 13 hours and the catalyst composition solution contained 9 ml methanol, 3 ml toluene, 0.02 mmol palladium acetate, 0.4 mmol trifluoroacetic acid and 0.024 mmol 1,3-bis[di(2-methophenyl)phosphino]propane. The yield of copolymer was 111 g of LVN, measured at 60oC in m-cresol, of 4.3 dl/g and a melting point of 265° C. When the filtrate and wash liquid were combined, 2.1 liters of methanolic solution were obtained which contained 0.36 mg of palladium and 0.1 g of oligomer. Thus, 17% wt of palladium was found in the liquid phase and the oligomer production, based on copolymer formed, was 0.09% wt.

COMPARATIVE EXAMPLE IV

A terpolymer of carbon monoxide, ethylene and propylene was produced by a procedure substantially like that of Comparative Example III except that the partial pressures of carbon monoxide, ethylene and propylene were 38 bar, 23 bar and 19 bar, respectively, and the reaction time was 8.5 hours.

The yield of terpolymer was 168 g and the terpolymer had an LVN, measured in m-cresol at 60° C., of 2.2 dl/g and a melting point of 221° C. Combination of the filtrate and wash liquid gave 1.9 liters of methanolic solution which contained 0.76 mg of palladium and 0.13 g of oligomers. Of the palladium provided, 36% wt was found in the liquid phases and the oligomer production was 0.08% wt, based on terpolymer formed.

ILLUSTRATIVE EXAMPLE I

A copolymer of carbon monoxide and ethylene was produced by a procedure substantially similar to that of Comparative Example III except that the reaction temperature was 90° C., carbon monoxide and ethylene were introduced to give partial pressures of 18 bar and 62 bar, respectively, and the reaction time was 1.4 hr. The yield of copolymer was 98 g and the copolymer had an LVN, measured at 60° C. in m-cresol, of 1.9 dl/g and a melting point of 260° C. Combination of the filtrate and wash liquid gave 2.2 liters of methanolic solution containing 1.6 mg palladium and 0.09 g of oligomer. Thus, 75% wt of the palladium provided was found in the liquid phases and the oligomer production, based on copolymer formed, was 0.09% wt.

ILLUSTRATIVE EMBODIMENT II

A carbon monoxide/ethylene copolymer was produced by a procedure substantially similar to that of Illustrative Embodiment I except that the 2.2 liters of methanolic solution obtained in Illustrative Embodiment I were introduced into the autoclave and no fresh catalyst solution was added. The reaction time was 2 hours instead of 1.4 hours. The yield of polymer was 96 g and the copolymer had an LVN, measured in m-cresol at 60° C., of 1.7 dl/g and a melting point of 258° C.

ILLUSTRATIVE EMBODIMENT II

A carbon monoxide/ethylene/propylene terpolymer was produced by a procedure substantially similar to that of Comparative Example I except that the reaction temperature was 90° C., the partial pressures of carbon monoxide, ethylene and propylene were 38 bar, 30 bar and 12 bar, respectively, the catalyst composition solution comprises 9 ml methanol, 3 ml toluene, 0.02 mmol palladium acetate, 0.4 mmol trifluoroacetic acid, and 0.24 mmol 1,3-bis[di(2-methoxyphenyl)phosphino]propane and the reaction time was 2.1 hours. The yield of terpolymer was 64 g and the terpolymer had an LVN, measured at 60° C. in m-cresol, of 1.5 dl/g and a melting point of 237° C. The filtrate and the wash liquid were combined to give 2.4 liters of methanolic solution containing 1.4 mg of palladium and 0.05 g oligomer. Of the palladium provided, 66% wt was found in the liquid phases and oligomer production, based on terpolymer formed, was 0.08% wt

ILLUSTRATIVE EMBODIMENT IV

A terpolymer of carbon monoxide, ethylene and propylene was produced by a procedure substantially similar to that of Illustrative Embodiment III except that the 2.4 liters of combined filtrate and wash liquid from Illustrative Embodiment III were charged to the reactor and no fresh catalyst composition solution was added, and the reaction time was 5.9 hours. The yield was 96 g of terpolymer having an LVN, measured in m-cresol at 60° C., of 1.6 dl/g and a melting point of 238° C.

What is claimed is:

1. A process of producing linear alternating polymer of carbon monoxide and at least one ethylenically unsaturated hydrocarbons having a limiting viscosity number, measured in m-cresol at 60° C., of from about 0.5 dl/g to about 2.5 dl/g and a melting point of at least 225° C., which comprises contacting the carbon monoxide and ethylenically unsaturated hydrocarbon in a reactor in a ratio such that the olefin/carbon monoxide partial pressure ratio is from about 0.5 to about 5, under polymerization conditions in the presence of a reaction diluent in which the linear alternating polymer is substantially insoluble and a catalyst composition formed from a palladium salt, an anion of a non-hydrohalogenic acid having a pKa below 2 and a bidentate phosphorus ligand of the formula

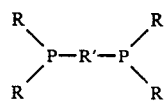

wherein R' is a divalent bridging group having from 2 to 4 carbon atoms in the bridge and R independently is aromatic substituted on at least one ring carbon ortho to the ring carbon atom connected to the phosphorus with a lower alkoxy substituent, therein forming a product mixture comprising a liquid portion and a solid portion, said liquid portion comprising primarily reaction diluent and catalyst composition and said solid portion comprising primarily said linear alternating polymer, separating the liquid portion of the resulting product mixture from the solid portion and recycling the liquid portion to said reactor.

2. The process of claim 1 wherein the linear alternating polymer is represented by the repeating formula
$-[CO-(CH_2-CH_{4x})-(CO)_{13}G_y$
wherein G is a moiety of propylene polymerized through the ethylenic unsaturation and the ratio of y:x is no more than about 0.5.

3. The process of claim 2 wherein the catalyst composition is formed from a palladium alkanoate, the anion of trifluoroacetic acid and the lower alkoxy substituent of the bidentate phosphorus ligand is methoxy.

4. The process of claim 3 wherein the polymerization conditions are a temperature of from about 40° C. to about 120° C. and a pressure of from about 20 bar to about 150 bar.

5. The process of claim 4 wherein the palladium alkanoate is palladium acetate and the bidentate phosphorus ligand is 1,3-bis[di(2-methoxyphenyl)phosphino]propane.

6. The process of claim 5 wherein, subsequent to separation of the liquid portion of the product mixture from the linear alternating polymer, the polymer is washed with reaction diluent and the wash liquid is combined with the liquid portion of the product mixture and at least a portion of the resulting combined liquids is recycled as catalyst composition to a subsequent polymerization.

7. The process of claim 6 wherein y is 0.

8. The process of claim 6 wherein the ratio of y:x is from about 0.01 to about 0.01.

* * * * *